US006973649B1

(12) United States Patent
Pazel

(10) Patent No.: US 6,973,649 B1
(45) Date of Patent: *Dec. 6, 2005

(54) UTILIZING PROGRAMMING OBJECT VISUAL REPRESENTATION FOR STATE REFLECTION

(75) Inventor: Donald P. Pazel, Montrose, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/409,277

(22) Filed: Sep. 30, 1999

(51) Int. Cl.[7] .............................................. G06F 9/46
(52) U.S. Cl. .................. 718/100; 717/105; 715/763
(58) Field of Search .............................. 345/157–163; 715/762, 763; 717/104–109, 114–116; 718/100–104; 719/316–320, 328

(56) References Cited

U.S. PATENT DOCUMENTS

| | | | | |
|---|---|---|---|---|
| 5,517,663 A | * | 5/1996 | Kahn ......................... | 395/173 |
| 5,832,270 A | * | 11/1998 | Laffra et al. ................ | 395/703 |
| 5,883,639 A | * | 3/1999 | Walton et al. ............... | 345/473 |
| 5,913,063 A | * | 6/1999 | McGurrin et al. ........... | 395/702 |
| 6,014,138 A | * | 1/2000 | Cain et al. .................. | 345/335 |
| 6,052,515 A | * | 4/2000 | Bruckhaus .................. | 716/1 |
| 6,182,024 B1 | * | 1/2001 | Gangopadhyay et al. ..... | 703/22 |
| 6,366,300 B1 | * | 4/2002 | Ohara et al. ................ | 715/771 |
| 6,446,081 B1 | * | 9/2002 | Preston ...................... | 707/104.1 |
| 6,683,624 B1 | * | 1/2004 | Pazel et al. ................. | 715/763 |
| 6,684,385 B1 | * | 1/2004 | Bailey et al. ............... | 717/109 |

* cited by examiner

Primary Examiner—St. John Courtenay, III
Assistant Examiner—George L. Opie
(74) Attorney, Agent, or Firm—Whitham, Curtis & Christofferson, P.C.; Stephen C. Kaufman

(57) ABSTRACT

A method and apparatus for utilizing graphical representations of programming objects to reflect the state of programming objects. State reflection is unique in that it reflects the state of programming objects at the time of programming, rather than during execution, in a visual programming language. The visual programming language comprises a set of graphic aspects which are associated with data element states via a set of graphic aspect references. Each programming object used in the visual programming language comprises a set of data elements. The programming objects may be related via super and subclass objects structures. The method detects when a data element has changed its state and reflects that state change in the visual representation of the programming objects and their respective graphic aspects. A list of graphic aspect references points to a number of graphic aspects which may or may not be applicable to the detected state change. All applicable graphic aspects are applied to the visual representation of the data element whose state has changed. As other data element state changes occur, the applicable graphical aspects are applied accordingly.

9 Claims, 5 Drawing Sheets

UTILIZING PROGRAMMING OBJECT VISUAL REPRESENTATION FOR STATE REFLECTION

BACKGROUND OF THE INVENTION

1. Field of the Invention

The present invention generally relates to the field of visual programming languages and object-oriented programming languages and, more particularly, to the utilization of graphical elements for representing objects used in programming. It encompasses a method by which programming state with reference to programming objects is reflected through the graphical elements in the course of programming,

2. Background Description

The motivation behind visual programming language technology is to utilize visual representations of programming elements to build and generate programs. The field is very large. Generally however, the approaches to visual programming may be classified into the following:

- Visual Designers—Those in visual programming languages, which focus on the construction of user interface applications. Much of the focus is on interface form and presentation construction with caveats for generating event code to facilitate textual programming of other parts of an application.
- Wiring-Based Languages—These languages have visual representations of programming entities, such as objects or processes Programming proceeds by creating and connecting visual representations with lines, which typically indicate data or event flow.
- Structured-Logic Based—These focus on structuring the logic of a program. Typically logic is represented with nested graphical figures which represent logical entities, e.g. if, loops, etc. Typically visual representations of programming objects are not shown in these tools.
- Form-Based—These are visual programming languages of the spreadsheet genre. Typically represented as grids or arrays of numbers, a textual macro language usually accompanies the language to do more complex manipulations.

Most visual programming languages are wiring-based. The power of this type of language resides in its ability to represent parallelism. That is, its power is its ability to show either simultaneous, concurrent, or alternate possible executions at the same time. The focus of these types of languages has been a connection paradigm (wires) which generally indicates either event or data flow.

Whereas the connectivity aspect is the chief asset of these languages, it is also its greatest liability. Wire-based language programs become difficult to decipher even in modestly complex examples, as the causal nature of execution rapidly gets lost in the implicit parallelism of the diagram. Also, the visual element that represents the object tends to be limited. Generally, visual elements are either named boxes representing variables, or iconic representations. By virtue of lacking good visual representations for the programming object, one cannot easily tell the state of a programming object. For example, in the course of programming, some data may attain default settings, or some aspects of an object's data may be inaccessible, or some measure of allocable resource may be depleted. This type of information may be derived from either code analysis or from information assumed in the course of programming the application itself. Limited representations typically utilized in the current state of the art do not have enough richness to indicate this level of detail, nor were they intended to show that level of detail.

SUMMARY OF THE INVENTION

It is therefore an objective of the present invention to provide a method and apparatus for utilizing graphical representations of programming objects to reflect the state of programming objects.

As a matter of clarification and distinction, the teaching on state reflection is unique in that it reflects the state of programming objects at the time of programming in a visual programming language. Many visual programming languages have graphical representations for program objects. However, they typically reflect state during execution as opposed to during programming, which is the teaching of this invention. On the other hand, any visual programming language that utilizes visual representations, for programming objects during programming, typically have relegated them to trivial visualizations with no indication of programming state.

According to the invention, the visual programming language comprises a set of graphic aspects which are associated with data element states via a set of graphic aspect references. Each programming object used in the visual programming language comprises a set of data elements. The programming objects may be related via super and subclass objects structures.

The aspect process detects when a data element has changed its state and reflects that state change in the visual representation of the programming objects and their respective graphic aspects. A list of graphic aspect references points to a number of graphic aspects which may or may not be applicable to the detected state change. All applicable graphic aspects are applied to the visual representation of the data element whose state has changed. As other data element state changes occur, the applicable graphical aspects are applied accordingly.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention relates to a method and apparatus for utilizing graphical elements for programming objects to reflect programming state. In preferred embodiments, a number of different types of programming objects may be graphically represented including but not limited to local and global variables. These include variables of common types such as, but are not limited to, integer, real, string, character, and Boolean, as well as untyped objects. They also include objects that are derivatives or composites of these and other variables, such as is taught in object-oriented technology, i.e. programming objects based on the classic object-oriented methodology.

The present invention refers to graphical elements as the means by which these objects are displayed on a computer. In general, in preferred embodiments of the present invention, these include graphical elements such as, but not limited to, squares, ellipses, and irregular shapes. Properties of these elements include, but are not limited to, size, color, border line type, and border color.

Other geometric shapes such as trapezoids, triangles, and the like are contemplated for use by the present invention. In addition, non-traditional, graphical elements, which rely on techniques of 3-dimensional figures, animations, and the like, are contemplated. Accordingly, the method and apparatus of the present invention is not limited to any one type of graphical element for the representation of programming elements.

Figure 1:
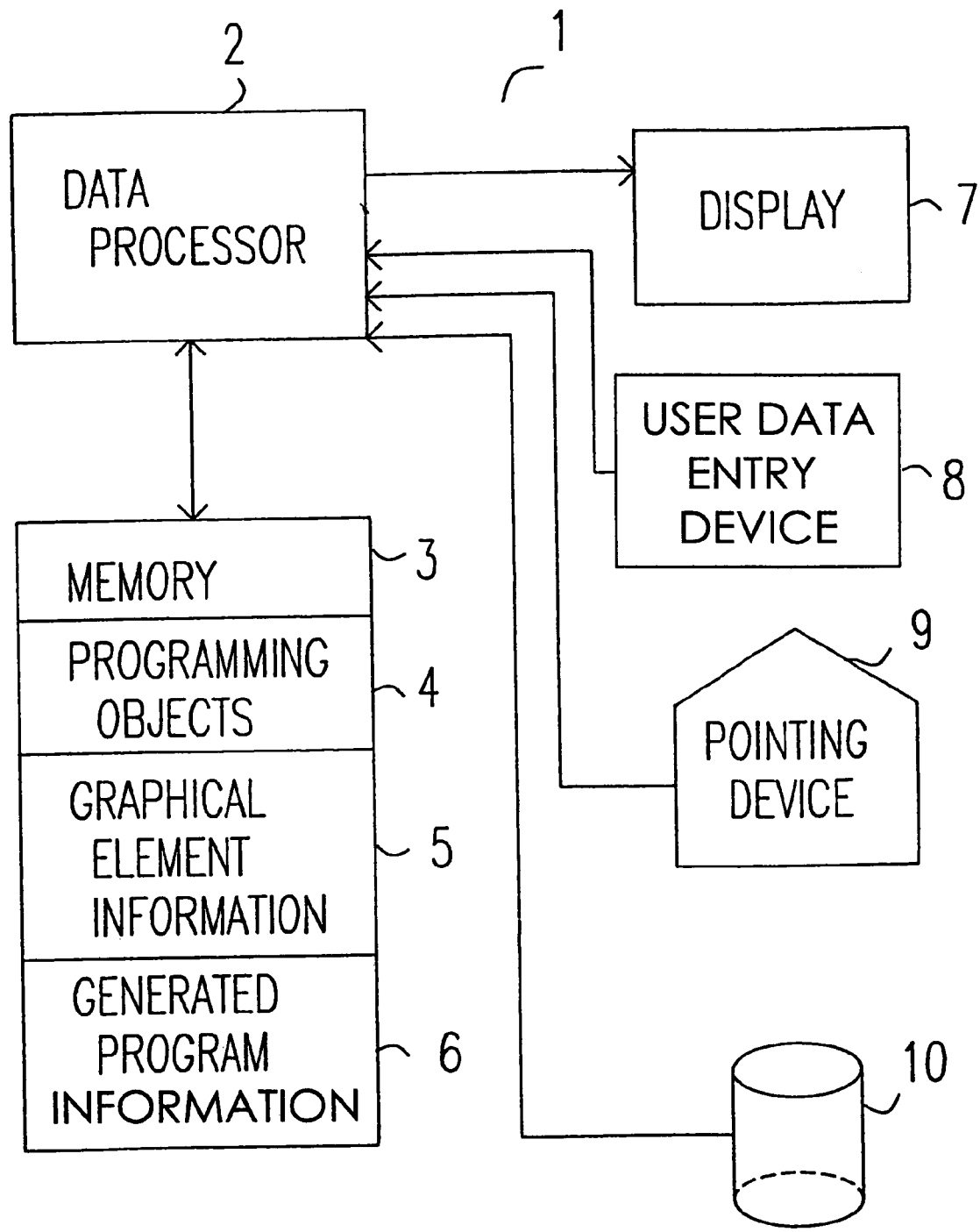
FIG. 1 depicts a block diagram of a data processing system for the visual programming language of this invention.

Referring now to the drawings, and more particularly to FIG. 1, there is shown a block diagram of a data processing system 1 for a visual programming language of the present invention. In a preferred embodiment, the data processing system 1 is a personal computer (PC) such as an IBM APTIVA computer (IBM and Aptiva are both registered trademarks of the International Business Machines Corporation). However, other data processing systems 1 are also contemplated for use by the present invention. For example, the invention can be implemented using a plurality of separate electronic circuits or devices (e.g., hardwired electronic or logic circuits, or programmable logic devices (PLDs) such as, PLAs (Programmable Logic Array), PALs (Programmable Array Logic), or the like). A suitable programmed, general purpose computer, e.g., a microprocessor, microcontroller or other processor device (central processing unit (CPU) or microprocessing unit (MPU)), either alone or in conjunction with one or more peripherals (e.g. integrated circuit), data and signal processing devices can be used to implement the invention. In general, any device or assembly of devices on which a finite state machine capable of implementing the flow charts shown in the figures can be used as a controller with the invention.

Referring again to FIG. 1, the data processing system 1 of the present invention comprises a data processor 2 having a memory 3. The memory 3 is coupled to the data processor 2 via a bidirectional bus. In preferred embodiments, the memory 3 includes program and data memory. The memory also includes information about the programming objects 4, information about graphical element information 5, including graphical information representing the programming objects 4. The memory includes generated program information 6 about the program generated by the programming objects.

The graphical element information 5 (e.g., programming objects represented as graphical elements) is displayed on the display 7, which is coupled to the data processor 2. In the preferred embodiments of the invention, a user data entry device 8, (e.g., keyboard or other interactive device) and a pointing device 9, for example, a mouse or a trackball, are also coupled to the data processor 2.

In a preferred embodiment, the display 7 provides a presentation space in order to display the programming object of the present invention. In further embodiments, either the pointing device 9 or predefined keys of the user data device 8 may be used to manipulate the data in conformity with the present invention.

It is also contemplated, for preferred embodiments, that a persistent storage mechanism 10 may exist and be utilized to store the generated program information 6. This type of storage media may include, but not be limited to, standard disk drive technology, tape, or flash memory. In a preferred embodiment, the program information may be both stored onto the persistent media, and/or retrieved by similar data processing system 1 for execution. It is also anticipated that sufficient information about programming objects and their graphical elements may be stored and/or retrieved in such a fashion as to allow the further modification of the generated program utilizing the stored information about programming objects 4 and graphical element information 5.

Figure 2:
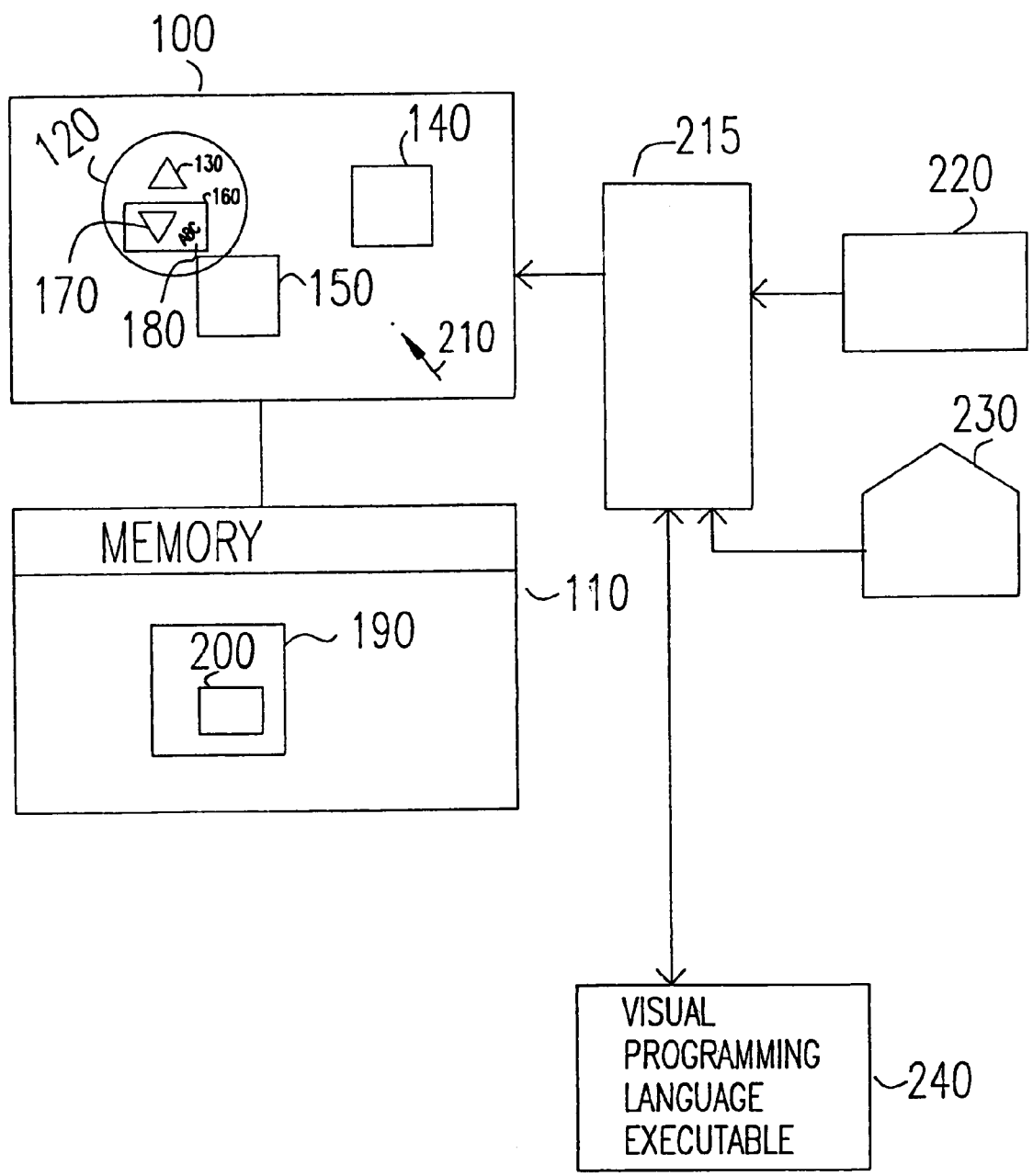
FIG. 2 depicts the relationship between programming objects and their graphical rendering in the present invention.

Referring now to FIG. 2, there is shown a block diagram of a visual programming language of the present invention running on a processing system as just described. The teaching of this diagram is to illustrate the relationship between the programming objects 190 and 200 in memory and their rendering on the display 100. In this example, programming object 190 logically contains within it a programming object 200. By way of illustration, 190 may represent a variable in a visual programming language for a person, and 200 may represent a variable, logically contained within the variable 190, in a visual programming language for the person's name. As a matter of distinction of importance, these do not represent actual instances of data for the person and name, but rather, by being a variable, are an abstract representation for person and name utilized in building a program within a visual programming language.

The display 100 shows a number of graphical elements of various shapes and sizes. Again, this is by way of illustration, and the teaching of this invention is not to be construed in any way to be limited to aspects of this illustrative rendering. It is the intent of this diagram to show that graphical elements 120, 130, 140, 150, and 160, the latter being further comprised of graphical elements 170 and 180 provide a visual representation of the programming object. Note that the separate graphical elements are not necessarily in a particular relationship, nor in any size or any other aspect of relationship. All that is noted is that the aggregate of these graphical elements represents the programming object 190. This association between a programming object and graphical elements is presumably defined in some appropriate methodology, for example, a graphical editor or through some textual definition.

In FIG. 2, the graphical element 160 which includes graphical elements 170 and 180, represents the name programming variable 200 which is logically contained within the programming variable 190. Graphical representations 120, 130, 140, 150 and 160 (further containing graphical elements 170 and 180) correspond to the programming variable 190. This serves to further illustrate the recursive nature of the mapping of programming objects to graphical elements. In this case, the relationship between programming variable 200 and its graphical elements 160, 170 and 180 may have been established prior to building programming variable 190 and its graphical relationships. When programming variable 190 was constructed, it simply utilized its existing graphical elements within programming variable 200, and added others.

Manipulation of the graphical elements shown on the display 100 is achieved through, but not limited to the means mentioned in the description of FIG. 1. As is typical to the industry, and by way of illustration, a mouse cursor 210 is utilized on the screen for manipulating graphical elements using the mouse device 230. Any of the general techniques of that interaction can be used, including but not limited to, moving, pushing (as in push buttons), and drag-drop. Alternatively, similar effects can be had utilizing a keyboard 220.

Again in FIG. 2, the visual programming language is an executable program 240 running on the processor 215. The visual programming language program provides the logic for translating manipulations of graphical elements on the display to manipulations of programming objects in memory. It also provides a means for sending appropriate instructions to the processor 215 and the display 100 in order to render appropriately the graphical elements, which visually represent the programming objects in memory.

Figure 3:
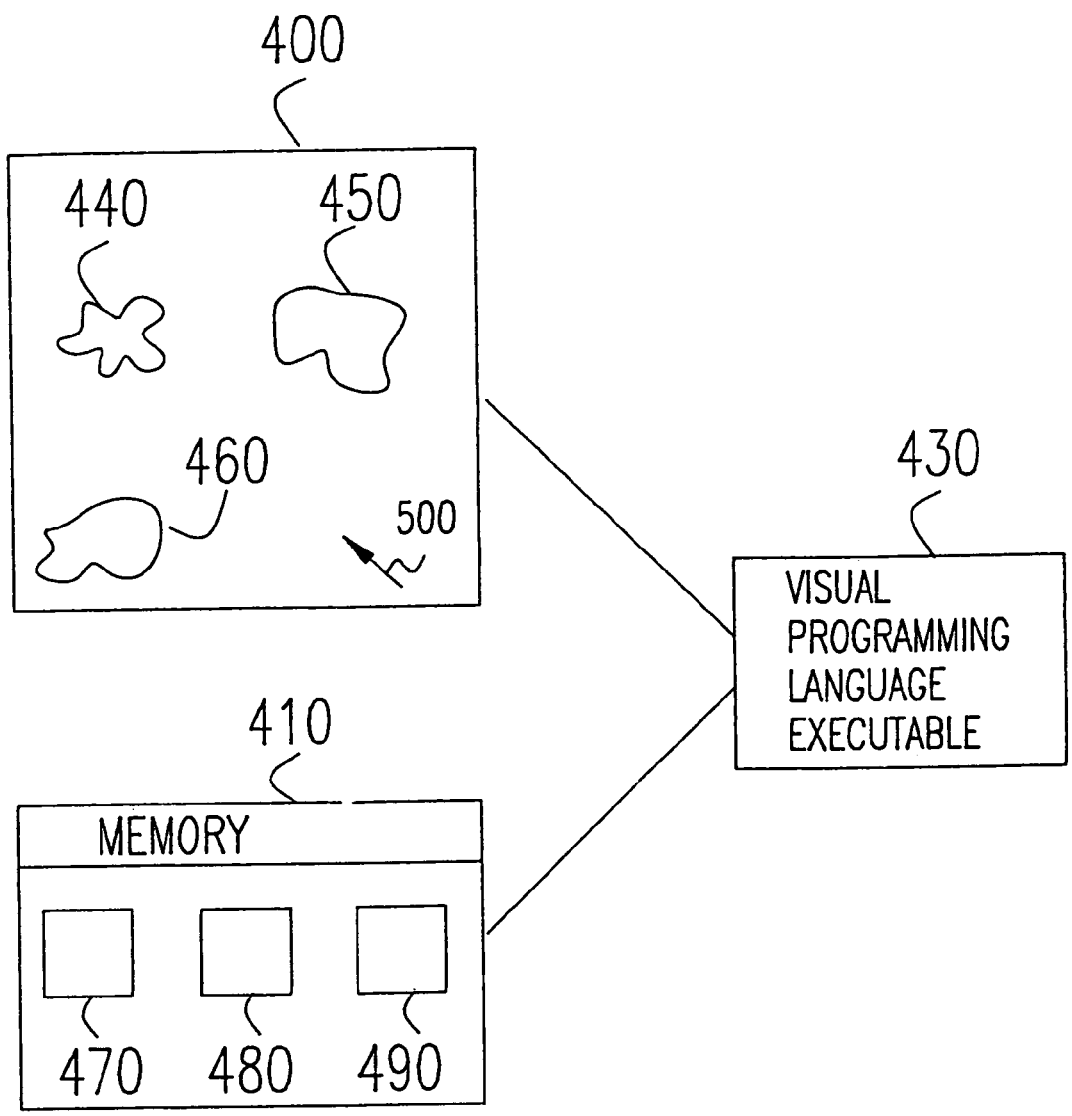
FIG. 3 depicts the basic notion of state reflection in the present invention.

Referring now to FIG. 3, there is shown a block diagram of a visual programming language of the present invention. The teaching of this diagram is to illustrate the product of this invention, namely programming object state reflection. FIG. 3 shows a display 400 along with memory 410 for programming objects. The display 400 depicts visual representations 440, 450 and 460 of the programming objects 470, 480 and 490 in a manner discussed for FIG. 2. A mouse cursor 500 is also shown. The visual programming language executable 430 maintains the relationships between the visual representations and the programming objects, again, as discussed for FIG. 2.

In the course of programming with the programming objects 470, 480 and 490, the states of these programming objects may change. For example, the data they represent may not be initialized, or they may be set to some default values. Through program analysis or other means, general characteristics may be determined, for example, that their values may be within a certain set of values or ranges. This all depends upon the nature of the variables, and the values they may be assigned. When for a given programming object, at any point in programming, characteristics such as these are determined, it is said that the programming object's programming state is determined. It is the teaching of this invention that when these states are determined they can induce changes in the graphical properties of the visual representation of the object. By way of illustration, if a programming object is known to have been set to some default value, the color of some related graphical element might be set to red. This process is known as state reflection.

Figure 4:
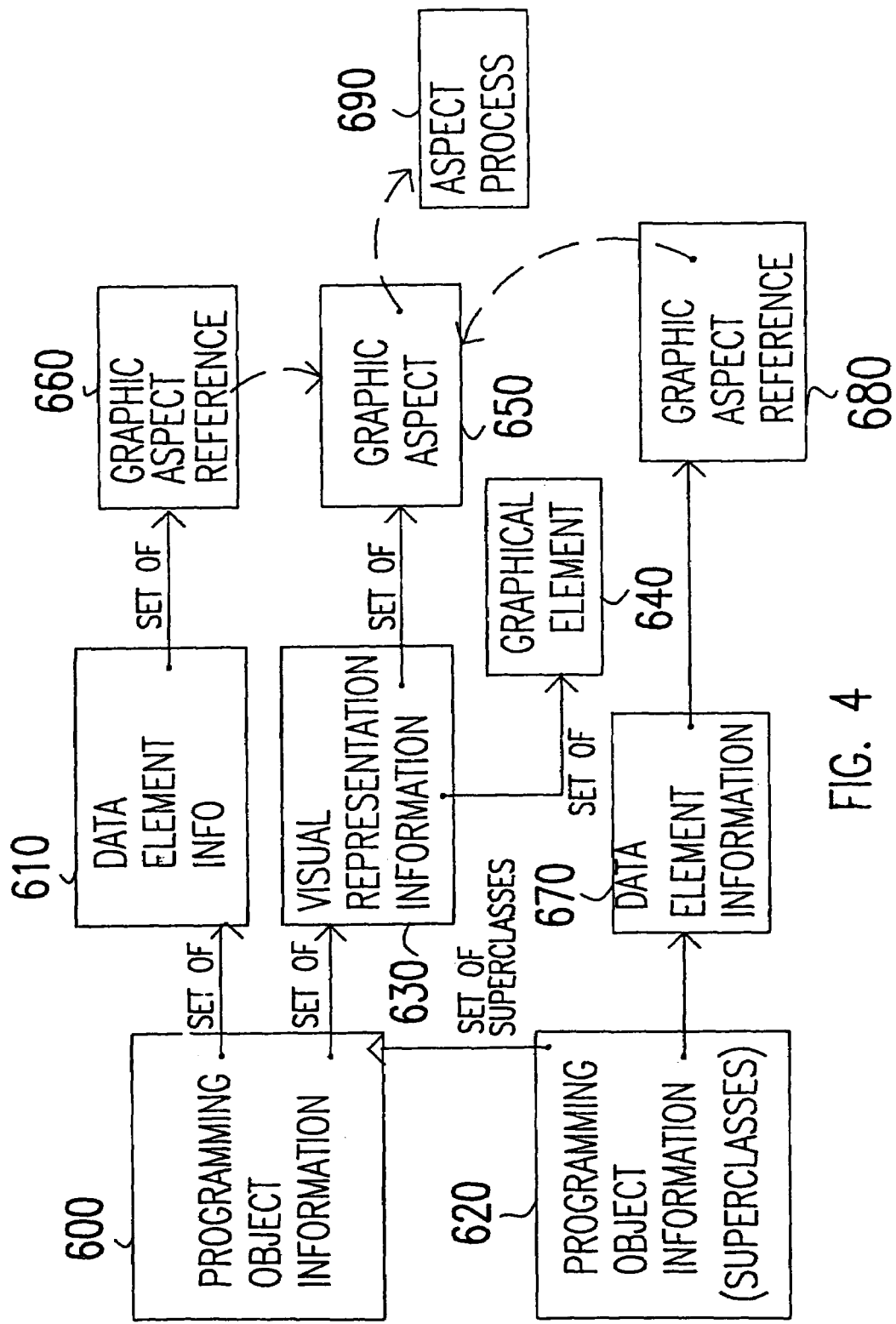
FIG. 4 depicts an overview of the computer structure of data for state reflection in the present invention.

Referring now to FIG. 4, there is shown a block diagram indicating data information to be maintained to implement state reflection in this invention. For each programming object used to program in the visual programming language, there exists information or data 600, which describes the composition of this programming object. Amongst this data are lists or sets of data element information 610, each of which further describes the data or programming objects which 600 contains. For example, a billing programming object would, for instance, have data elements representing programming objects for the customer's name, address, etc. In an object-oriented system, the programming object 620 would reference its set of possible superclasses 600, and have a structure of the kind of 600 but pertaining to superclasses of the programming object 620.

There is also shown, in FIG. 4 for the programming object 600, a set of data information 630 describing visual representations for this programming object when utilized in visual programming. Each visual representation would, for example, consist of, but not be limited to, a set of graphical elements 640 of various visual characteristics. Having multiple visual representations enhances the interactive capabilities of programming with the programming object. These representations may be presented in a mutually exclusive manner (only one at a time for this instance of the programming object), or one or more may be concurrently visualized in palettes, etc.

Each visual representation 630 has flexibility in altering graphical properties of its graphical element 640 in arbitrary manners. Any particular well-defined means of alteration is called graphical aspect 650, and each visual representation has a set of them. Any number of implementations may be employed to implement a graphical aspect, including but not restricted to rules-based processing, descriptive-data, or even hand-written programs. The implementation means is designated as an aspect process 690 to which the graphic aspect has access.

Again in FIG. 4, each data element 610 has a set of graphic aspect references 660, each of which serves as a reference pointer to an appropriate graphic aspect 650. The motivation for the existence of this reference is that when the data of a data element changes in some manner, the appropriate graphic aspect may be located quickly.

It should be noted in FIG. 4, that there exists a many-to-one relationship between references to graphic aspects and graphic aspects. As shown for programming object 620 which is a subclass to programming object 600, there exists a set of data elements 670, each with a set of graphic aspect references 680. Since the data in superclasses are also contained in subclasses, the visual representation, of the superclass can be affected by data that is part of a subclass. This justifies, for example, the existence of the graphic reference 680 to a graphic aspect 630 in the superclass.

Also for clarification purposes, it would be undesirable for a graphic aspect reference of a superclass to refer to a graphic aspect of a subclass. In that case, while an instance of a programming object 600 may be a superclass of some object 620, it also may not be. Therefore, the graphic aspect of the subclass 620 would in that instance be irrelevant to the superclass 600.

Figure 5:
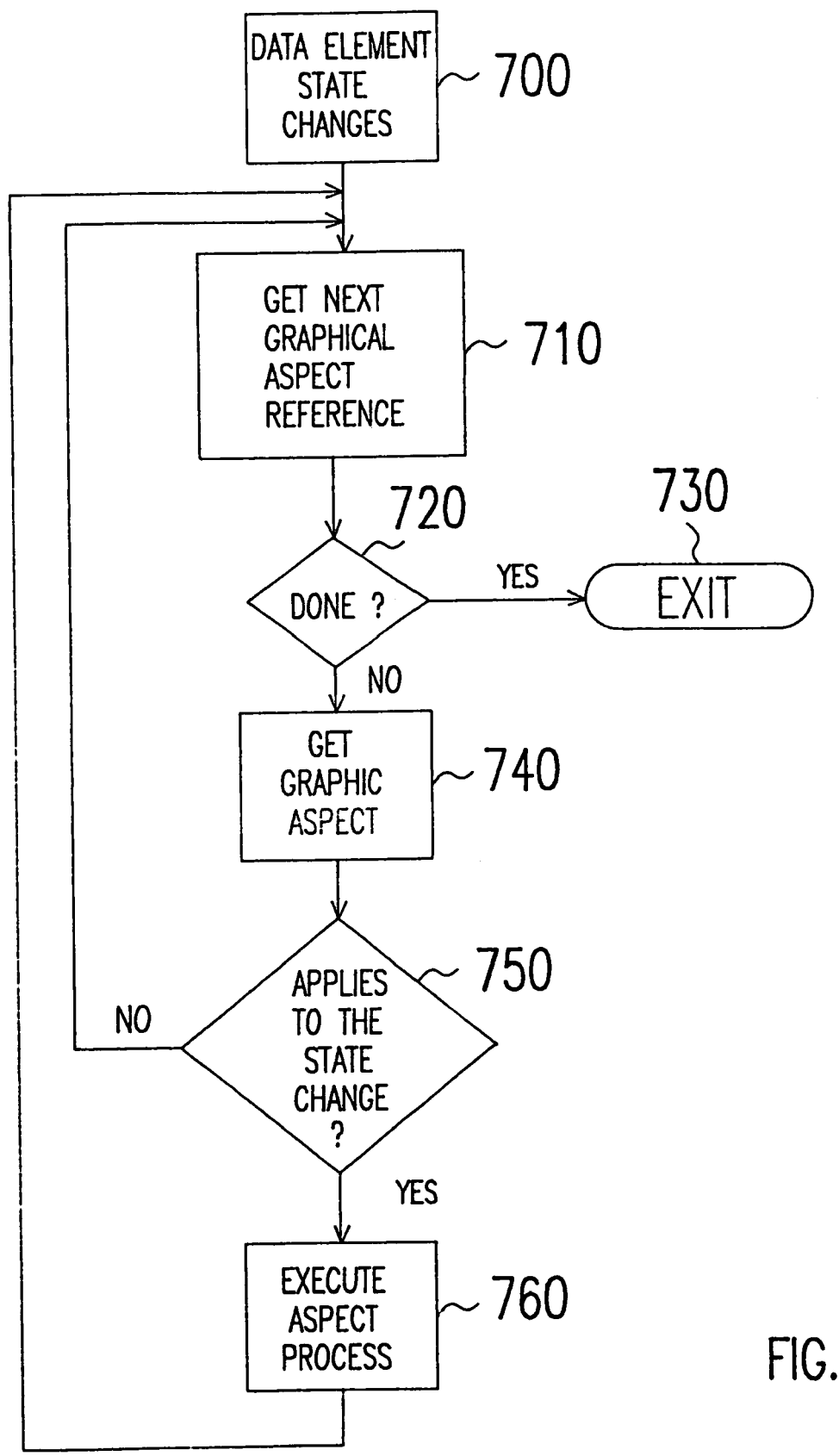
FIG. 5 depicts a block diagram showing the program execution flow for programming state reflection.

Referring now to FIG. 5, there is shown a block diagram of process execution statements within a visual programming language whereby a change in a data element within a programming object is reflected as a change in a visual representation of a programming object. The execution sequence begins with the detection of a change 700 in the state of a data element. Typically, this happens because in the course of typical activities of a visual programming language, a state change is called for by the rules of the language and thus made in the normal course of executing the visual programming language. That being the case, it can be safely assumed that at 700, the data element is acquired.

Again in FIG. 5, the next step involves a traversal of the list of graphical aspect references. Thus, an acquisition of the next graphical aspect reference is done 710. On the first instance of this step, the first graphical aspect reference is acquired. A check is made if the list traversal is finished 720. If so, an exit is made 730. Otherwise, reference is utilized to acquire the graphic aspect 740. A check is then made as to whether this aspect should be applied regarding this state change 750. If not, the main loop continues with the acquisition of the next graphical aspect 710. If it does, the aspect process is executed 760, making appropriate changes to the visual representation. Control returns to acquiring the next graphical aspect 710.

While the invention has been described in terms of a single preferred embodiment, those skilled in the art will recognize that the invention can be practiced with modification within the spirit and scope of the appended claims.

What is claimed is:

1. A computer implemented method of visual representation of programming objects as graphical elements, wherein program properties of said programming objects are reflected through graphical properties of graphical elements, the method comprising the steps of:
   detecting a change in a program property of a programming object in visual representation and shown visually on a display device as one or more graphical elements, wherein graphical elements represent the programming object and program properties of programming objects are reflected through graphical element properties;
   determining graphical aspect changes that apply to graphical elements of the programming object appropriate for the change in a program property of the programming object; and
   applying the graphical aspect changes to corresponding graphical elements, wherein the graphical aspect changes include changes in color, position and size.

2. A computer implemented method as recited in claim 1, wherein determining graphical aspect changes further comprises the steps of:
   traversing a list of graphical aspect references to acquire a graphic aspect for the data element, wherein there is a many-to-one relationship between graphical aspect references and a graphic aspect; and
   for each graphic aspect referenced by the list of graphic aspect references, determining whether the graphic aspect applies to the change in state.

3. A computer implemented method as recited in claim 1, wherein the visual representation of a first programming object may include other visual representations corresponding to at least one additional programming object logically contained within the first programming object.

4. A computer implemented method as recited in claim 1, wherein more than one visual representation is defined for a programming object.

5. A computer implemented method as recited in claim 4, wherein any of the more than one visual representation may be used for the programming object.

6. A computer implemented method as recited in claim 1, wherein the visual representation for a superclass of a programming object is used as the visual representation for a subclass programming object.

7. A computer implemented method as recited in claim 6, wherein a visual representation of a superclass of the programming object is used as a visual representation for a subclass of the programming object.

8. An apparatus for visual representation of programming objects as graphical elements comprising:
   a data processing system comprising a display device, an interactive device, as in a keyboard, a pointing device, a storage device, and a data processor;
   memory coupled to the data processor via a bidirectional bus, wherein the memory includes a first memory section for at least one program and a second memory section for data;
   computer code comprising a visual programming language, wherein the computer code is stored in th first memory section, and the computer code detects a change in a program property of a programming object, determines graphical aspect changes that apply to graphical elements which represent the programming object, and applies graphical aspect changes to said visual representation of said programming object which represents the change of the program property of the programming object; and
   means for displaying a visual representation of a plurality of graphical elements on the display device, wherein displayed graphical elements represent programming objects and program properties of programming objects are reflected through displayed graphical element properties.

9. A machine readable medium containing code for visual representation of programming objects as graphical elements, wherein program properties of said programming objects are reflected through graphical properties or graphical elements, the code implementing the steps of:
   detecting a change in a program property of a programming object in visual representation and shown visually on a display device as one or more graphical elements, wherein graphical elements represent the programming object and program properties of programming objects are reflected through graphical element properties;
   determining graphical aspect changes that apply to graphical elements of the programming object appropriate for the change in a program property of the programming object; and
   applying the graphical aspect changes to corresponding graphical elements, wherein the graphical aspect changes include changes in color, position and size.

* * * * *